United States Patent Office 3,141,489
Patented July 21, 1964

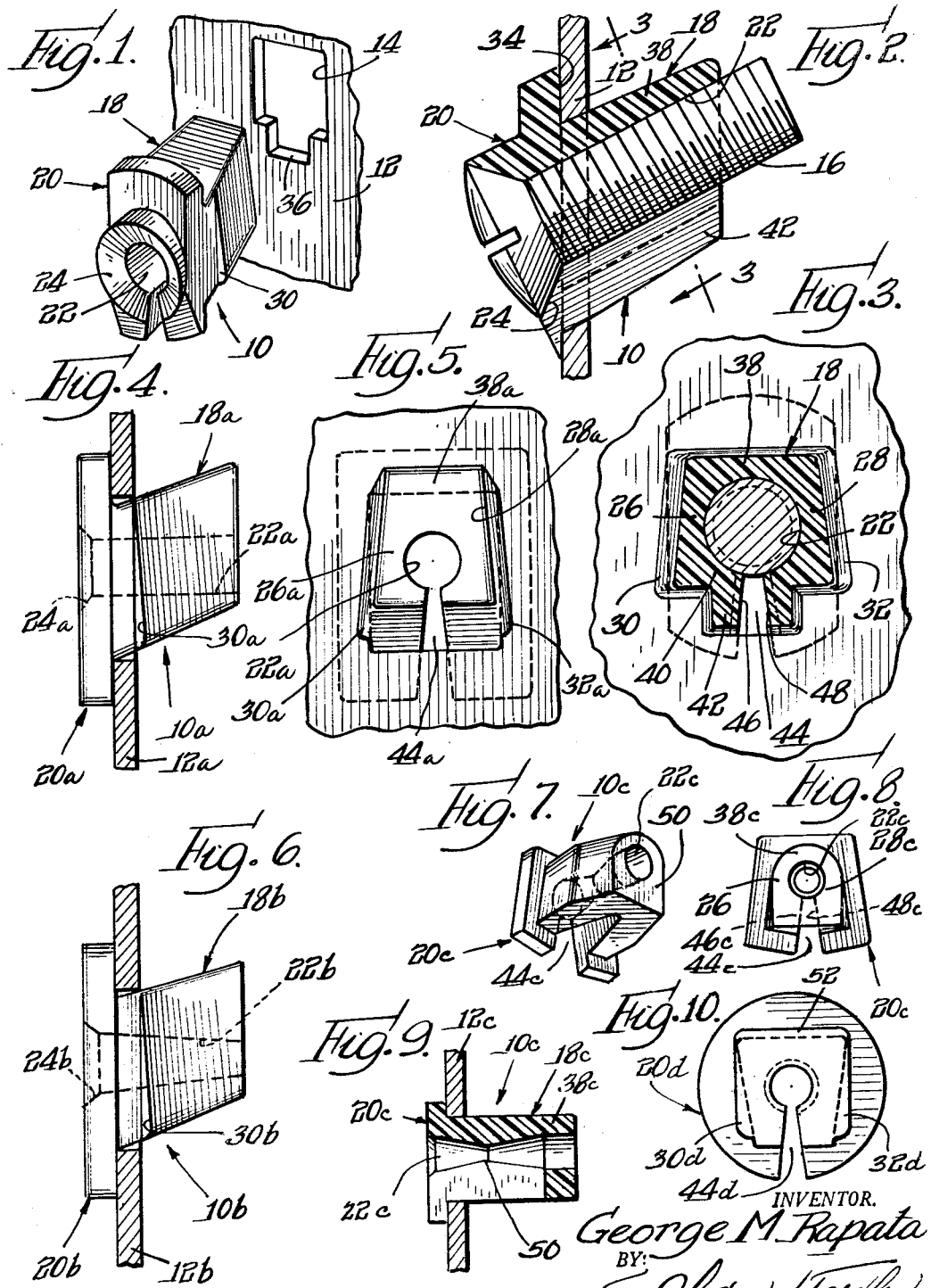

3,141,489
SCREW GROMMET
George M. Rapata, Park Ridge, Ill., assignor to Illinois Tool Works Inc., a corporation of Delaware
Filed Jan. 7, 1960, Ser. No. 1,046
6 Claims. (Cl. 151—41.75)

The present invention relates to a novel fastening device, more specifically to a novel anchor member or grommet adapted to be applied to an apertured work piece for receiving a complementary fastener element such as a screw. This application is a continuation-in-part of my application Serial Number 771,485, filed November 3, 1958.

While various uses for anchor members or grommets of the present invention will suggest themselves, the grommets are particularly suitable for application to automobile door panels for receiving complementary fastening elements or screws which serve to mount various parts such for example as arm rests. In such installations, rain water and the like may enter the interior of the door and run down the panel so that there is a possibility that the water might pass through the anchor member or grommet to the interior of the automobile. Furthermore, in many installations, the apertured work piece or panel may be inclined or the part to be mounted against the panel may be formed so that certain heretofore proposed anchor members or grommets having shanks extending perpendicularly from head portions may not be conveniently used.

An important object of the present invention is to provide a novel grommet or anchor member having a shank portion adapted to be snapped through an apertured work piece or panel and slotted so as to facilitate radial collapsing and expansion thereof during application to the work structure, the grommet being slotted and formed so as to minimize any possibility of the passage of water or foreign material therethrough.

Another important object of the present invention is to provide a novel grommet structure adapted to be applied to an apertured work piece or panel and to receive a complementary fastening element such as a screw and the like which may be inserted into the grommet at an acute angle with respect to the work piece or panel.

Another object of the present invention is to provide a novel one piece plastic grommet having a slotted shank and an axially extending bore for accommodating the complementary element such as a screw, which grommet is constructed so that as a screw is applied thereto, the formation of proper complementary threads for improved stripping resistance is assured.

Still another object of the present invention is to provide a novel one piece plastic anchor member of the above described type which is constructed so that during application of a screw element or the like thereto, the shank is progressively increasingly laterally expanded for improving the holding power of the grommet.

Other objects and advantages of the present invention will become apparent from the following description and the accompanying drawings wherein:

FIG. 1 is a perspective view showing an anchor member or grommet in position to be inserted into an apertured work piece or panel;

FIG. 2 is a sectional view showing the grommet of FIG. 1 fully applied to the panel and further showing a screw element threaded into the grommet;

FIG. 3 is a sectional view taken along line 3—3 in FIG. 2;

FIG. 4 is a partial sectional view showing a modified form of the present invention;

FIG. 5 is an entering end view of the assembly shown in FIG. 4;

FIG. 6 is a partial sectional view showing another modified form of the present invention;

FIG. 7 is a perspective view showing another embodiment of the present invention;

FIG. 8 is an entering end view of the device shown in FIG. 7;

FIG. 9 is a sectional view showing the device of FIGS. 7 and 8 applied to a work piece or panel; and FIG. 10 is an entering end view showing another embodiment of the invention.

Referring now more specifically to the drawings wherein like parts are designated by the same numerals throughout the various figures.

A grommet 10 incorporating features of the present invention is shown in FIGS. 1, 2 and 3. The grommet is formed in one piece from a suitable tough resilient plastic material such as nylon, and preferably the grommet is formed by a molding operation. The device 10 is adapted to be applied to a work piece or panel 12 having an aperture 14 therein and it is further adapted to receive a complementary fastening element such as a screw 16.

The grommet 10 comprises an elongated shank portion 18 which is insertable through the work piece aperture 14, and a head portion 20 integral with the trailing end of the shank portion. A bore 22 extends entirely through the grommet from the head portion to the free or entering end of the shank portion for receiving the screw 16. The bore initially is formed with a smooth or unthreaded surface and has a diameter throughout its length similar to and not substantially greater than the root diameter of the threads of the screw 16 so that when the screw is applied to the grommet, complementary threads will be formed or impressed in the wall of the bore 22. Preferably the bore 20 is provided with a flared mouth 24 in the head portion 20 for facilitating application of the screw to the bore.

The shank portion 18 has opposite side sections 26 and 28 which respectively include integral shoulder elements 30 and 32 which are engageable behind the work piece or panel for resisting withdrawal of the anchor member or grommet from the work piece. The head portion is provided with a laterally extending work piece engageable surface 34 facing the shoulder elements for cooperating with the shoulder elements for securely fixing the grommet with respect to the work piece. It is to be noted that in accordance with an important feature of the present invention, the work piece engageable or clamping surface 34 of the head portion is disposed in a plane which is arranged at an acute angle with respect to the longitudinal axis of the shank portion 18 and the bore 22. In addition, the shoulder elements 30 and 32 present work piece engageable surfaces which are substantially parallel to the clamping surface 34 of the head portion and are thus arranged at substantially the same acute angle with respect to the axis of the shank portion. With this structure, the laterally extending shank portion 18 will project at an acute angle with respect to the work piece or panel 12 with which the grommet is assembled as shown in FIG. 2 whereby the device is particularly suitable for installations wherein the work piece or panel may be inclined or wherein it is desired to have the head portion arranged at an angle with respect to the panel. As shown best in FIG. 2, the bore 22 also extends at an acute angle with respect to the cooperable clamping faces of the grommet and the panel 12 so that the screw 16 may be applied to the grommet in a direction which is disposed at the same acute angle with respect to the panel.

The aperture 14 is provided with a non-circular configuration which in the embodiment shown, is rectangular. A lower edge of the aperture 14 is notched or provided with a keyway 36 for the purpose described below. As shown in FIG. 3, the shank portion 18 has a non-circular configuration similar in size and shape to that of the opening 14. Thus the shank portion includes an upper side section 38 extending between margins of the opposite side sections 26 and 28, and a lower side section 40 from which an integral key portion 42 depends. It will be noted that the surfaces of the opposite side sections 26 and 28 flare downwardly and outwardly from the upper side section 38 so that the shank portion has a generally trapezoidal configuration.

The entering end of the shank portion is tapered from the shoulder elements 30 and 32 for facilitating initial starting of the shank portion through the aperture 14, but the transverse dimension of the shank portion between the opposite surfaces of the side sections 26 and 28, particularly in the vicinity of the shoulder means 30 and 32 is greater than the width of the aperture 14 so that the generally trapezoidal shank portion must be radially collapsed or reduced to the size and shape of the generally rectangular opening 14 in order to enable the shoulder elements to be snapped through the work piece. In order to facilitate this collapsing action, a longitudinally extending slot 44 is provided through the bottom side section 40 and the key element 42, which slot intersects both the outer peripheral surface of the shank portion and the bore 22. The slot is defined by opposite side surfaces 46 and 48 which preferably converge toward each other in a direction extending toward the free or entering end of the shank. In addition the width of the slot is preferably such that when the shank is radially collapsed upon application to the apertured work piece, the opposite sides of the slot will be brought into close relationship so that the slot is at least partially closed and the bore 22 will have a substantially continuous but split annular surface engageable with the screw.

In the embodiment shown the slot 44 also extends through the head 20 and as will be appreciated, the slot 44 provides an avenue along which water or other foreign material may pass from one side of the panel to the other. However, any possibility of this occurring is minimized by another feature of this invention. More specifically, it is noted that the uppermost side 38 of the shank is continuous and imperforate and when the device is fully assembled with the work structure, the bore 22 will be effectively sealed by the screw 16. In addition the portion of the shank between the shoulder elements 30 and 32 and the head clamping surface 34 fits closely within and is expanded against the edges of the aperture 14. Thus the slot 44 remains the only avenue for the passage of water or other foreign material through the grommet, but the arrangement of the slot in the downwardly facing or lower side section 40 of the grommet substantially eliminates the possibility of the passage of water or the like therethrough. Furthermore, it will be noted that the peripheral configuration of the shank which includes the key element 42 positively prevents improper assembly and orientation of the grommet with respect to the work piece or panel and thereby insures positioning of the grommet with the slot 44 facing downwardly.

As indicated above, the surface of the bore 22 is initially smooth or unthreaded. Thus as the screw which may be a thread cutting screw, if desired, is turned into the grommet, complementary threads are formed in the bore wall. At the same time the radial pressure exerted by the screw aggressively biases the shoulder means 30 and 32 for secure engagement with the work piece. It is to be noted that the longitudinally extending corner portions of the shank are relatively thick and thereby provide sufficient resistance to radial expansion along the length of the shank to promote the formation of full depth threads in the wall of the bore 22 so as to obtain maximum stripping resistance. It will also be noted that the split sections of the key element 44 serve not only the function described above but also to strengthen and rigidify margins of the shank portion along the slot in order to resist undue radial expansion of the shank portion in the vicinity of the slot.

FIGS. 4 and 5 show a modified form of the present invention which is similar to the above described structure as indicated by the application of identical reference numerals with the suffix *a* added to corresponding elements. In this embodiment the bore 22a is disposed so that it extends at an angle to and traverses the longitudinal axis of the shank portion 18a. It will be noted, as a result of this arrangement of the bore, the upper side section of the shank becomes progressively thicker toward the entering end thereof while the lower side portion of the shank becomes progressively thinner and therefore increasingly yieldable or flexible. This arrangement is particularly advantageous in certain installations wherein it is desired to increase the amount of lateral expansion of the shank portion and therefore the interengagement between the shank portion and the apertured work piece when the screw is applied to the bore.

FIG. 6 shows an embodiment which is similar to the structure shown in FIGS. 4 and 5 as indicated by the application of identical reference numerals with the suffix *b* added to corresponding elements. This embodiment differs in that the bore 22b is tapered toward the entering end of the shank. As a result even greater expansion of the shank may be obtained upon application of the screw thereto while at the same time, the formation of substantially full depth threads in the bore wall by the screw is assured. It will be appreciated that the bore of the embodiments shown in FIGS. 1–3 and 7–9 may also be tapered in substantially the same manner as the bore 22b.

FIGS. 7, 8, and 9 show a device 10c which is similar to the grommets described above as indicated by the application of identical reference numerals with the suffix *c* added to the corresponding elements. In this embodiment, the shank portion is provided with the non-symmetrical transverse cross sectional shape by rounding the closed side section 38c in order to insure proper orientation of the device with respect to the work piece. In addition, the opposite side walls 46c and 48c of the slot converge toward each other and join together at a point spaced from the entering end of the shank so that the shank is provided with a circumferentially continuous entering end section 50 which serves to resist radial expansion of the outer or entering end of the shank and to insure maximum engagement of the outer end portion of the shank with the screw.

As shown best in FIG. 3, the opposite side sections 26c and 28c diverge with respect to each other in a direction extending transversely of the slot in a manner such that, when the shank is inserted through a generally D-shaped opening in a work piece, the diverging side sections will be radially collapsed sufficiently to shift the slot side surfaces 46c and 48c into substantially abutting relationship. It should also be noted that the bore 22c tapers from both ends to a minimum diameter at an intermediate location 50 disposed in the vicinity of the shoulder portion of the shank. The diameter at 50 is preferably less than the root diameter of the screw to be applied to the bore for insuring maximum expansion of the shoulder portion of the shank.

FIG. 10 shows an embodiment 10d similar to the structures described above. In this form a shoulder 52 extends across the upper side of the shank between the lateral shoulders 30d and 32d. In addition, the portion of the shank between the head and the shoulders has the trapezoidal shape shown in broken lines with the sides tapering downwardly away from the upper shoulder 52. This device is particularly suitable for application to a substantially complementary trapezoidal hole in a work piece since expansion of the side wall upon application of a screw causes the device to "ride up" in the hole for more securely engaging the shoulder 52 behind the work piece. The slot 46d may extend to the end of the shank as shown or terminate short of a peripherally continuous shank end portion as shown in FIG. 8.

While the preferred embodiments of the present invention have been shown and described herein, it is obvious that many special details may be changed without departing from the spirit and scope of the appended claims.

The invention is claimed as follows:

1. A one piece plastic grommet for application to a generally upright apertured work piece comprising an elongated laterally extending shank insertable through a work piece aperture, an enlarged head portion integral with a trailing end of said shank and including work piece engageable surface means disposed substantially in a plane traversing a longitudinal axis of the shank, and means defining a bore extending through said head portion and into said shank for accommodating a complementary fastener element such as a screw, said shank including a longitudinally extending upper side section and longitudinally extending laterally facing opposite side sections, all of which sections are continuous throughout their length, said upper portion having an upper surface extending obliquely upwardly from adjacent said head portion for engaging behind an upper margin of the workpiece aperture, said shank including shoulder means integral with said laterally facing side sections substantially below said upper surface for engaging behind a work piece and combining with said upper surface in obtaining three spaced areas of contact with said workpiece for resisting withdrawal of the shank from the work piece, and said shank including longitudinally extending slot means only in a longitudinally extending bottom side section thereof and intersecting said bore for facilitating collapsing of the shank during insertion thereof into a work piece aperture and also for facilitating subsequent expansion of the shank when the complementary fastener element is inserted into said bore means, said slot means providing the sole interruption entirely through any of said side sections.

2. A grommet, as defined in claim 1, wherein said shank includes a laterally projecting key element cooperable with complementary edges of a work piece aperture for insuring orientation of the grommet relative to the work piece with said slot means facing downwardly.

3. A grommet, as defined in claim 1, wherein said bore means extends at an angle with respect to a longitudinal axis of said shank and progressively approaches an exterior surface of said bottom side section in a direction extending toward an entering end of the shank for promoting progressive radial expansion of the shank upon application of said complementary fastener element thereto.

4. In combination, a one piece plastic grommet, and a generally upstanding work piece having an aperture therethrough of nonsymmetrical configuration, said grommet comprising an elongated laterally extending shank extending through the work piece aperture, an enlarged head portion integral with a trailing end of said shank and overlying one side of the work piece, and bore means extending through said head portion and into said shank for accommodating a complementary fastener such as a screw, said shank including an upwardly facing longitudinally extending side section which is continuous and imperforate throughout its length, said upwardly facing section having an upper surface extending obliquely upwardly from adjacent said head portion and engaging behind an upper edge of said workpiece aperture, said shank including a pair of oppositely disposed laterally facing longitudinally extending side sections which are continuous and imperforate throughout their lengths, said shank comprising integral shoulder means, said laterally facing longitudinally extending side sections substantially below said upper surface and engaging behind the work piece in opposition to said head portion for resisting withdrawal of the shank from the work piece, said shank also including longitudinally extending slot means only in a longitudinally extending bottom side section thereof and intersecting said bore means for facilitating collapsing of the shank during insertion into a work piece aperture and also for facilitating subsequent expansion of the shank when the complementary fastener element is inserted into the bore means, and said shank having peripheral surface means having a nonsymmetrical transverse cross section for engaging complementary edge means of the work piece aperture and assuring orientation of the shank in the work piece aperture with said slot means facing downwardly.

5. A grommet, as defined in claim 4, wherein said shank comprises an integral longitudinally extending key element along said bottom side section and split by said slot means and providing said peripheral surface means with a depending portion.

6. A one-piece plastic grommet for application to a generally upright apertured workpiece comprising an elongated laterally extending shank insertable through a workpiece aperture, an enlarged head portion integral with a trailing end of said shank and including workpiece engageable surface means disposed for overlying the workpiece, and means defining a bore extending through said head portion and into said shank for accommodating a complementary fastener element such as a screw, said shank including longitudinally extending upper and bottom side sections and opposite laterally facing side sections, said upper and laterally facing side sections being continuous and imperforate, said shank section including shoulder means integral with said laterally facing side sections for engaging behind a workpiece and resisting withdrawal of the shank from the workpiece, said shank having a generally trapezoidal cross sectional configuration in the vicinity of said shoulder means for facilitating entry of the shank into the apertured workpiece, said upper side section having an upper surface extending obliquely upwardly from adjacent said head portion for engaging behind an upper edge of said workpiece aperture, and said shank including longitudinally extending slot means only in said bottom side section thereof and intersecting said bore for facilitating collapsing of the shank during insertion thereof into the workpiece aperture and also for promoting subsequent expansion of the shank when the complementary fastener element is inserted into said bore means, said slot means providing the sole interruption extending entirely through any of said side sections.

References Cited in the file of this patent

UNITED STATES PATENTS

| 2,420,826 | Irrgang | May 20, 1947 |
| 2,687,862 | Crowther | Aug. 31, 1954 |
| 2,788,829 | Edwards | Apr. 16, 1957 |
| 2,836,214 | Rapata | May 27, 1958 |
| 2,836,216 | Rapata | May 27, 1958 |
| 2,961,691 | Roy et al. | Nov. 29, 1960 |